United States Patent
Ha et al.

(10) Patent No.: US 12,438,221 B2
(45) Date of Patent: Oct. 7, 2025

(54) RENEWABLE ENERGY TRANSFER SYSTEM AND METHOD

(71) Applicants: Hyundai Motor Company, Seoul (KR); Kia Corporation, Seoul (KR)

(72) Inventors: Dong Hyun Ha, Seoul (KR); Jung Hun Choi, Hwaseong-Si (KR); Jae Wung Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 681 days.

(21) Appl. No.: 17/836,759

(22) Filed: Jun. 9, 2022

(65) Prior Publication Data

US 2023/0261298 A1  Aug. 17, 2023

(30) Foreign Application Priority Data

Feb. 14, 2022 (KR) ........................ 10-2022-0019185

(51) Int. Cl.
| | |
|---|---|
| *H01M 50/204* | (2021.01) |
| *H01M 50/242* | (2021.01) |
| *H01M 50/251* | (2021.01) |
| *H01M 50/289* | (2021.01) |
| *H01M 50/296* | (2021.01) |
| *H02J 7/00* | (2006.01) |

(52) U.S. Cl.
CPC ....... *H01M 50/204* (2021.01); *H01M 50/242* (2021.01); *H01M 50/251* (2021.01); *H01M 50/289* (2021.01); *H01M 50/296* (2021.01); *H02J 7/0045* (2013.01)

(58) Field of Classification Search
None
See application file for complete search history.

(56) References Cited

U.S. PATENT DOCUMENTS

2021/0091436 A1*  3/2021  Haring ................ H01M 50/258

* cited by examiner

*Primary Examiner* — Wyatt P McConnell
(74) *Attorney, Agent, or Firm* — Morgan Lewis & Bockius LLP

(57) ABSTRACT

A renewable energy transfer system includes a storage configured to store renewable energy; a transportation configured to transport the storage; and a cabin configured to charge and store the storage, wherein the cabin includes a support portion for supporting the storage, an accommodation portion formed in at least a portion of the support portion to selectively accommodate the storage therein, and a charging unit provided in the accommodation portion to transfer the renewable energy to the storage, and wherein the storage includes a body portion configured to be inserted into the accommodation portion, and a charging terminal formed in at least a portion of the body portion to receive the renewable energy from the charging unit.

20 Claims, 7 Drawing Sheets

RENEWABLE ENERGY TRANSFER SYSTEM AND METHOD

CROSS-REFERENCE TO RELATED APPLICATION

The present application claims priority to Korean Patent Application No. 10-2022-0019185, filed on Feb. 14, 2022, the entire contents of which is incorporated herein for all purposes by this reference.

BACKGROUND OF THE PRESENT DISCLOSURE

Field of the Present Disclosure

The present disclosure relates to a renewable energy transfer system and method.

Description of Related Art

The content described in the present section merely provides background information for the present disclosure and does not constitute the related art.

In accordance with the current atmosphere that values resource depletion, safety issues, and eco-friendly values, the proportion of renewable energy is increasing as an alternative to three major power generations such as thermal power, hydroelectric power, and nuclear power. Renewable energy includes power generation using infinite energy sources such as solar power, solar heat, tidal power, wave power, wind power, and geothermal heat.

More than 70% of the earth's surface is the sea, and Korea is surrounded by sea on three sides and has a good environment to use the infinite energy of the sea, so domestic interest in wave power generation is increasing. Wave power generation refers to a power generation method that produces electrical energy using the periodic up and down motion of the water surface caused by waves.

In the case of large-scale wave power generation, there is a spatial limit to installing a wave power plant on a shoreline adjacent to the ground. Furthermore, when the wave power plant is provided in the coastal waters and distant seas, energy transfer is difficult and expensive submarine cables are required, which results in considerable costs.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a renewable energy transfer system including: a storage configured to store renewable energy; a transportation configured to transport the storage; and a cabin configured to charge and store the storage, wherein the cabin includes a support portion for supporting the storage, an accommodation portion formed in at least a portion of the support portion to selectively accommodate the storage therein, and a charging unit provided in the accommodation portion to transfer the renewable energy to the storage, and wherein the storage includes a body portion configured to be inserted into the accommodation portion, and a charging terminal formed in at least a portion of the body portion to receive the renewable energy from the charging unit.

According to various aspects of the present disclosure, the present disclosure provides A renewable energy transfer method including: storing renewable energy in at least one storage using a cabin configured to charge and store the at least one storage; determining, among the at least one storage, one storage to be transferred from the cabin to a destination based on a distance from the cabin to the destination; allowing a transportation for transferring the one storage to approach the cabin; coupling the transportation to the one storage; and transferring the one storage using the transportation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
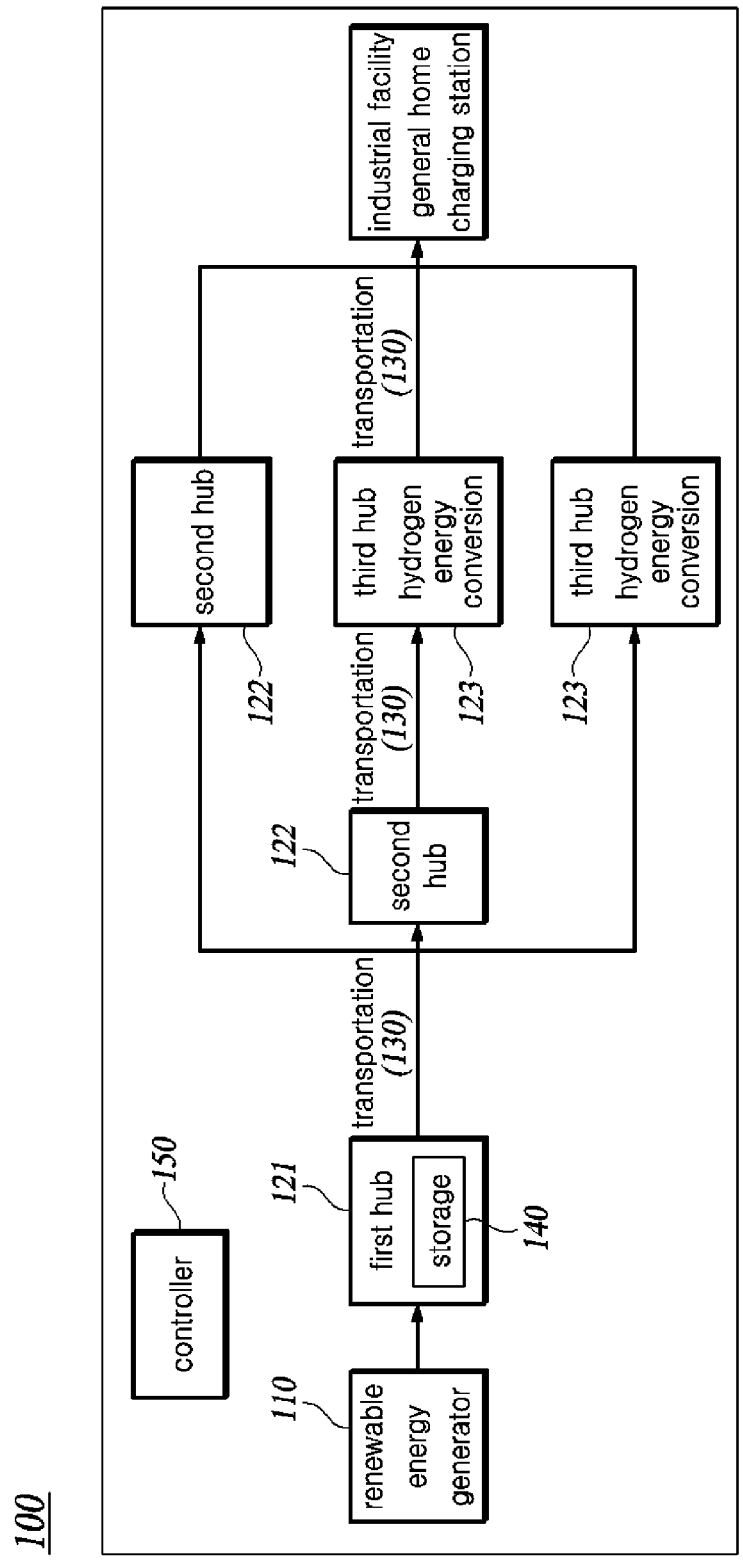
FIG. 1 is a block diagram of a renewable energy generation system including a renewable energy transfer system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In view of the above, the present disclosure provides a renewable energy transfer system, which is configured for efficiently transferring renewable energy produced in the coastal waters and distant seas by transporting a renewable energy storage using a transportation.

Furthermore, the present disclosure provides a renewable energy transfer system, which is configured for efficiently charging and storing a transportation using a cabin for the transportation.

The object to be achieved by the present disclosure is not limited to the above-mentioned objects, and other objectives not mentioned will be clearly understood by those skilled in the art from the following description.

Hereinafter, some exemplary embodiments of the present disclosure will be described in detail with reference to the accompanying drawings. In the following description, like reference numerals designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a block diagram of a renewable energy power generation system including a charging and storage system for a renewable energy transportation according to an exemplary embodiment of the present disclosure.

Referring to FIG. 1, a renewable energy generation system 100 may include all or a part of a renewable energy generator 110, a first hub 121, a second hub 122, a third hub 123, a transportation 130, a storage 140, and a controller 150.

A plurality of renewable energy generators 110 are connected to each other using a cable, and may float in the coastal waters and distant seas. The plurality of renewable energy generators 110 may have a roly poly capsule shape. Each of the renewable energy generators 110 may convert wave energy into electrical energy to generate electric power.

A solar panel may be provided on a surface of the renewable energy generator 110. The solar panel may be provided on an upper surface of the renewable energy generator 110, that is, a portion which is not submerged in seawater. The renewable energy generator 110 may not only convert wave energy into electrical energy, but also convert solar energy into electrical energy using the solar panel.

The first hub 121 may be positioned to be surrounded by the plurality of renewable energy generators 110. The first hub 121 may be connected to the plurality of renewable energy generators 110 by cables to receive electrical energy from the plurality of renewable energy generators 110. The first hub 121 may receive electrical energy from the plurality of renewable energy generators 110 and store electrical energy. The electrical energy transmitted to the first hub 121 may charge the transportation 130 and the storage 140 coupled to the first hub 121. In the instant case, the transportation 130 may be an unmanned aerial vehicle (UAV), an unmanned ship, a drone, or the like.

The second hub 122 may be positioned to be surrounded by a plurality of first clusters including the first hub 121. The third hub 123 may be positioned to be surrounded by a plurality of second clusters including the second hub 122.

The transportation 130 may transfer the storage 140 and the electrical energy between the first hub 121, the second hub 122, and the third hub 123. Furthermore, the transportation 130 may transmit the storage 140 and the electrical energy to the first hub 121, the second hub 122, the third hub 123, and a separate place located on the ground. Here, the separate place may be a future mobility such as an electric vehicle (EV), a purpose built vehicle (PBV), an urban air mobility (UAM), or a robot, a charging station, a general home, an industrial facility, and the like. For example, the remaining power may be used by connecting a rechargeable eco-friendly vehicle to a power grid using vehicle to grid (V2G) technology. By use of a method in which an eco-friendly vehicle is charged using a power grid and the remaining electricity is supplied to the power grid again after driving of the vehicle, the eco-friendly vehicle may become a moving energy storage system (ESS).

The renewable energy generator 100 may convert electrical energy into hydrogen energy and transfer it. When energy is stored in the first hub 121, the second hub 122 and the third hub 123 for a long time period, a large amount of energy (1 TWh or more) may be stored. In the case of a large amount of energy, it is more suitable to store it as hydrogen energy than electrical energy. Furthermore, because hydrogen energy loses less energy than electrical energy during long-distance transport, it is suitable for transporting energy between countries.

Figure 2:
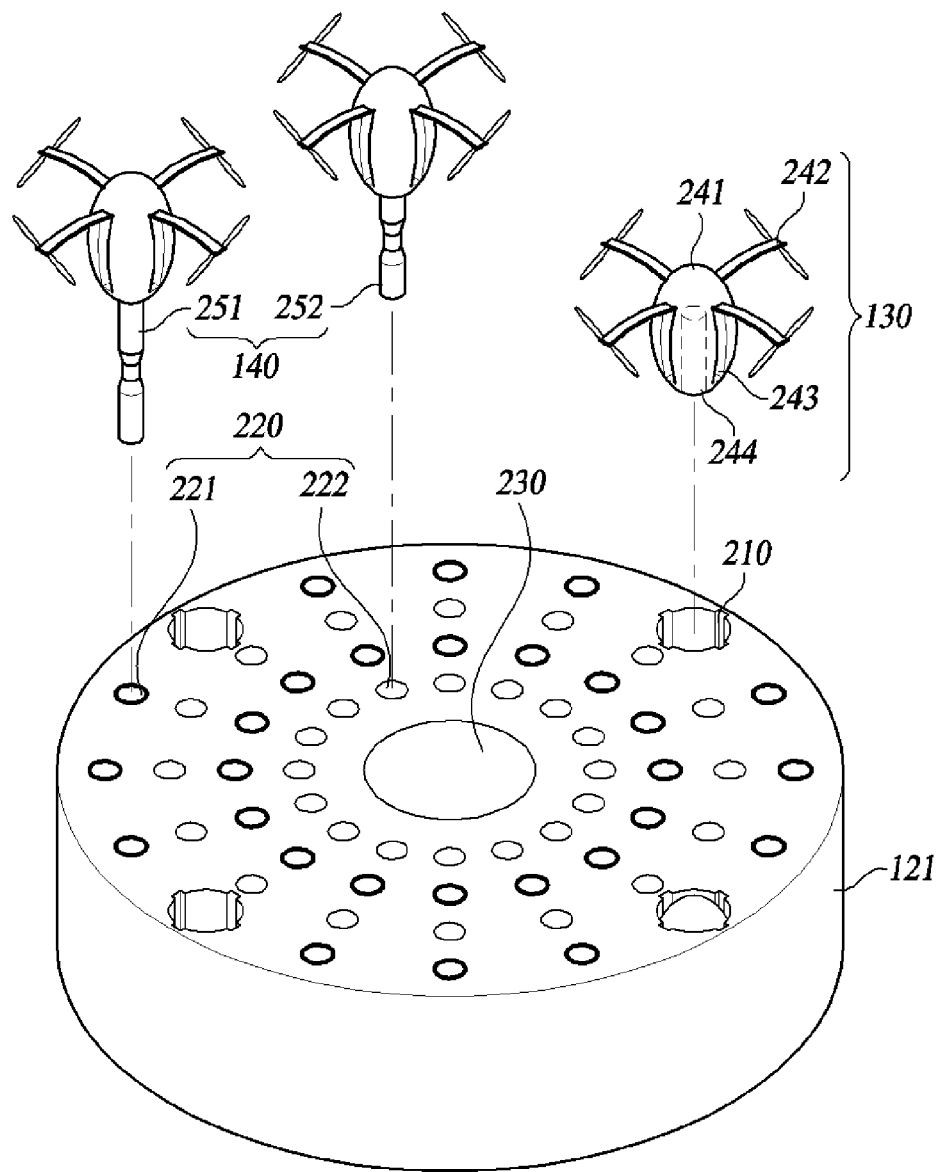
FIG. 2 is a view showing a configuration of the renewable energy transfer system according to an exemplary embodiment of the present disclosure.

FIG. 2 is a view showing a configuration of the renewable energy transfer system according to an exemplary embodiment of the present disclosure.

Figure 3:
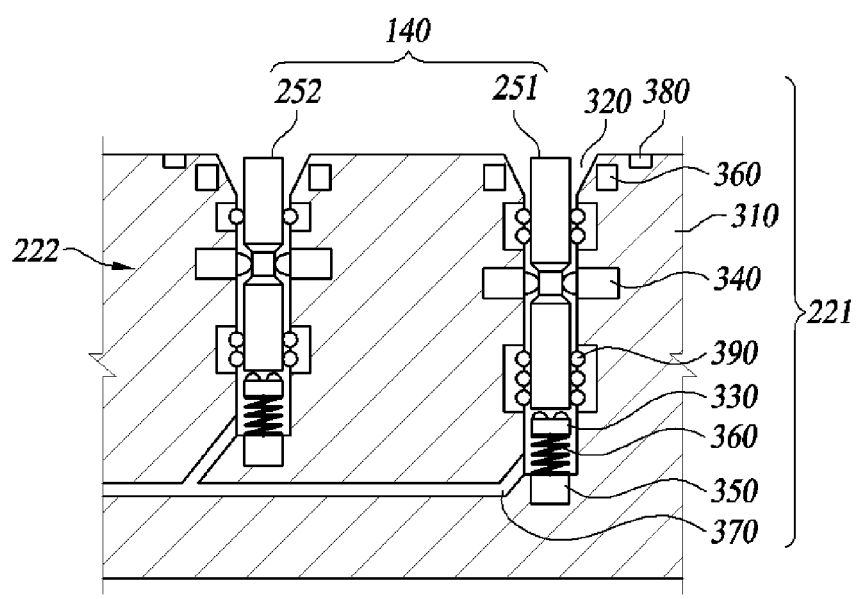
FIG. 3 is a view showing a configuration of a storage and a cabin for storage according to an exemplary embodiment of the present disclosure.

FIG. 3 is a view showing a configuration of a storage and a cabin for storage according to an exemplary embodiment of the present disclosure.

Referring to FIG. 2 and FIG. 3, a renewable energy transfer system 200 may include a first hub 121, a transportation 130, and a storage 140.

The first hub 121 may include a cabin for transportation 210, a cabin for storage 220, and a storage place 230.

The cabin for storage 220 may include a first cabin 221 and a second cabin 222.

Each of the first cabin 221 and the second cabin 222 may include a support portion 310, a receptacle 320, a charging unit 330, a locking unit 340, a sensor 350, a cushioning member 360, a drain 370, a communication unit 380 and a guiding unit 390.

The charging unit 330 may include a plug, an insulator formed to surround the plug, and a cable connected to the plug.

The transportation 130 may include a body portion 241, a wing portion 242, a wing receptacle 243, and a storage receptacle 244.

The storage 140 may include a first storage 251 and a second storage 252.

Each of the first storage 251 and the second storage 252 may include a storing unit and a charging terminal.

The first hub 121 may receive and store renewable energy from the renewable energy generator 110. The first hub 121 may charge the transportation 130 and the storage 140 using the renewable energy. At least a portion of the first hub 121 may be configured to charge and store the transportation 130 and/or the storage 140.

The cabin for transportation 210 is configured to charge and store the transportation 130. The cabin for transportation 210 may be formed in at least a portion of the first hub 121. A plurality of cabins for transportation 210 may be provided. The cabin for transportation 210 may charge the transportation 130 using renewable energy. The cabin for transportation 210 may have both a circular or expandable concept in which a propeller or arm may fit.

The cabin for storage 220 is configured to charge and store the storage 140 that stores renewable energy. The cabin for storage 220 may be formed in a part of the first hub 121 and may be provided in plural. The cabin for storage 220 may include the first cabin 221 and the second cabin 222. The first cabin 221 may accommodate the first storage 251 formed to be relatively long, and the second cabin 222 may accommodate the second storage 252 formed to be relatively short.

The support portion 310 may be formed in at least a portion of the first hub 121 to support the transportation 130. The receptacle 320 is formed in at least a portion of the support portion 310. The charging unit 330, the locking unit 340, the sensor 350, the cushioning member 360, and the communication unit 380 may be provided in the support portion 310. The drain 370 may be formed in the support portion 310.

The receptacle 320 is formed in the support portion 310 to accommodate at least a portion of the transportation 130. The receptacle 320 may be recessed from the surface of the support portion 310. The receptacle 320 may accommodate the storing unit of the storage 140. The charging unit 330, the locking unit 340, the sensor 350, the cushioning member 360, and the guiding unit 390 may be provided in the receptacle 320. The drain 370 may be formed to extend from the inside of the receptacle 320 to the outside so that foreign substances in the receptacle 320 are discharged therethrough.

The charging unit 330 may be provided in the receptacle 320 to transfer renewal energy to the storage 140. The charging unit 330 may charge the storage 140 using renewable energy transferred from the renewable energy generator 110. The charging unit 330 may be controlled by the controller 150 based on whether the storage 140 is inserted in the cabin for storage 220. The charging unit 330 may charge the storage 140 using a wired or wireless charging method. Here, the wireless charging method refers to a magnetic induction method, a magnetic resonance method, and an electromagnetic wave method. However, the method of charging the storage 140 by the charging unit 330 is not limited to the above-described methods, and may be charged using another method in accordance with the purpose and use.

The locking unit 340 may be provided in the receptacle 320. When the storage 140 is inserted in the receptacle 320, the locking unit 340 fixes the storage 140 to the support portion 310. The locking unit 340 may include a plurality of air tubes. As the plurality of air tubes expand, the storage 140 may be fixed to the support portion 310. Because the storage 140 is fixed to the support portion 310, the storage 140 may be stably charged and stored.

The sensor 350 may be provided at one end portion in the receptacle 320. The sensor 350 may detect whether the storage 140 is inserted in the receptacle 320. A plurality of sensors 350 may be provided. Based on the information detected by the sensor 350, the controller 150 may control the charging unit 330, the locking unit 340, the cushioning member 360, and the like.

The cushioning member 360 may be provided in the receptacle 320 or on the support portion 310. The cushioning member 360 may alleviate an impact which may occur when the storage 140 is inserted in the receptacle 320. The cushioning member 360 may alleviate an impact which may occur when the transportation 130 lands on the cabin for storage 220. The cushioning member 360 may be a spring, a damper, or an air tube. When the cushioning member 360 is an air tube, the air tube may be controlled by the controller 150.

The drain 370 may be formed through at least a portion of the support portion 310 to extend from the inside of the receptacle 320 to the outside. The inside of the receptacle 320 may be kept clean because rainwater and foreign substances inside the receptacle 320 are discharged to the outside through the drain 370.

The communication unit 380 communicates with the transportation 130 to obtain information on the transportation 130. The communication unit 380 may obtain information on a location of the transportation 130 and a distance between the transportation 130 and the cabin for transportation 210. The communication unit 380 may be provided at the support portion 310. The communication unit 380 may transmit the obtained information to the controller 150. The controller 150 may control the transportation 130, the cabin for transportation 210 and the cabin for storage 220 based on the information obtained by the communication unit 380. The communication unit 380 may communicate with the transportation 130 using an ultra-wide band (UWB) communication method or the like.

The guiding unit 390 may be provided inside the accommodation portion 320. The guiding unit 390 may guide the movement of the storage 140. The guiding unit 390 may include a plurality of ball bearings. The guiding unit 390 may be provided on both sides in a longitudinal direction of the accommodation portion 320.

The storage place 230 may be located in a center portion of the first hub 121. The transportation 130 such as a UAM, a UAV, and the like for transferring the storage 140 may be charged and stored in the storage place 230.

The transportation 130 may transfer the storage 140 which stores renewable energy from the first hub 121 to the second hub 122, the third hub 123, and a separate place. The transportation 130 may be configured to be coupled to at least a portion of the storage 140. The transportation 130 may be charged and stored by the cabin for transportation 210. The transportation 130 may be charged using renewable energy. The transportation 130 may communicate with the communication unit 380 to provide location and distance information to the communication unit 380. The transportation 130 may be a UAV, an unmanned ship, a drone, or the like. A plurality of transportations 130 may be provided.

The body portion 241 may be inserted into the cabin for transportation 210. One or more wing portions 242 may be provided to the body portion 241. The body portion 241 may be moved by the wing portion 242. The wing receptacle 243 and/or the storage receptacle 244 may be formed in at least a portion of the body portion 241.

The wing portion 242 may be provided to the body portion 241 to move the body portion 241. The wing portion 242 may include one or more wings. At least a portion of the wing portion 242 may be formed to be bendable. When the bendable portion of the wing portion 242 is bent, the wing portion 242 may be inserted into the wing receptacle 243 formed in the body portion 241. As the wing portion 242 is inserted into the wing receptacle 243, the entire volume of the transportation 130 is reduced when the transportation 130 is charged and stored.

The wing receptacle 243 may be formed in at least a portion of the body portion 241. The wing receptacle 243 may be recessed from the surface of the body portion 241. The wing portion 242 may be inserted into the wing receptacle 243. The wing receptacle 243 may be formed in a shape corresponding to a shape of the wing portion 242 to allow the wing portion 242 to be inserted therein.

The storage receptacle 244 may be formed in at least a portion of the body portion 241. The storage receptacle 244 may be recessed from the surface of the body portion 241. At least a portion of the storage 140 may be inserted into the storage receptacle 244. The storage receptacle 244 may be formed in a shape corresponding to the shape of the storage 140 so that the storage 140 is inserted. At least a portion of the storage 140 is inserted into the storage receptacle 244 to safely transfer the storage 140.

The storage 140 is a member that stores renewable energy and may be charged and stored by the cabin for storage 220. The storage 140 may be coupled to the transportation 130. At least a portion of the storage 140 may be inserted into the storage receptacle 244 of the transportation 130. The storage 140 may be transferred by the transportation 130. The storage 140 may be configured to be removably inserted in the cabin for storage 220. The storage 140 may store energy generated by the renewable energy generator 110 in a form of electrical energy or hydrogen energy. The storage 140 may include the first storage 251 formed to be relatively long and the second storage 252 formed to be relatively short. The controller 150 may efficiently transfer renewable energy by determining the storage 140 to be transferred based on a distance from the cabin for storage 220 to a destination and a weather condition.

The storage 140 may include a storing unit and a charging terminal. Renewable energy transferred from the renewable energy generator 110 may be stored in the storing unit. Renewable energy may be stored in a form of electrical energy or hydrogen energy in the storing unit. The storing unit may be inserted into the accommodation portion 320 of the cabin for storage 220. The charging terminal may be formed in at least a portion of the storing unit. The storage 140 may receive renewable energy using a charging terminal. The charging terminal may be formed to be adjacent to the charging unit 330 of the cabin for storage 220 in a state in which the storage 140 is inserted in the accommodation portion 320.

Figure 4A:
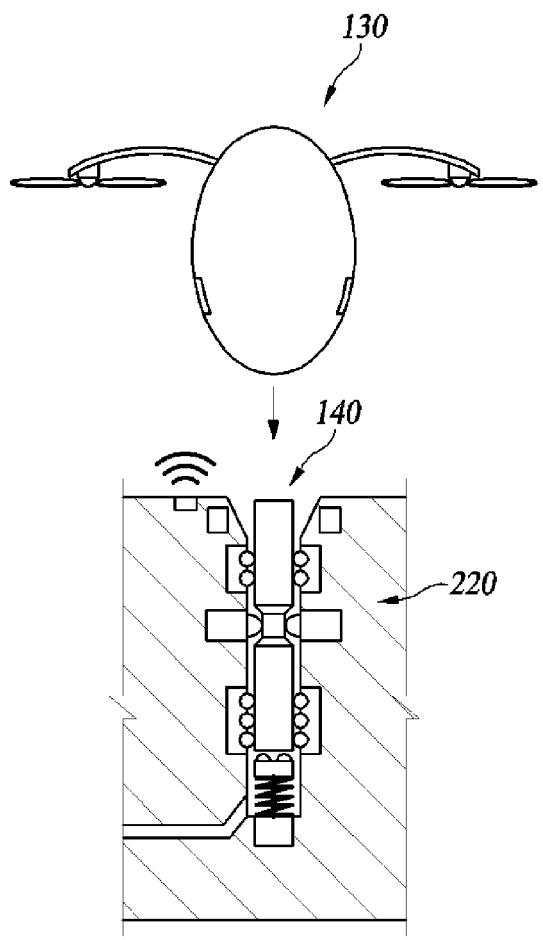
FIG. 4A, FIG. 4B and FIG. 4C are view showing an operating principle for the renewable energy transfer system according to an exemplary embodiment of the present disclosure.
Figure 4B:
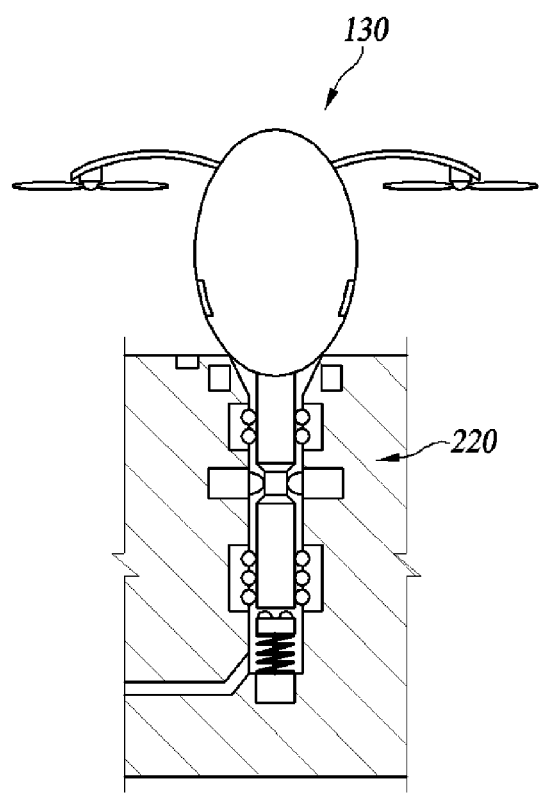
Figure 4C:
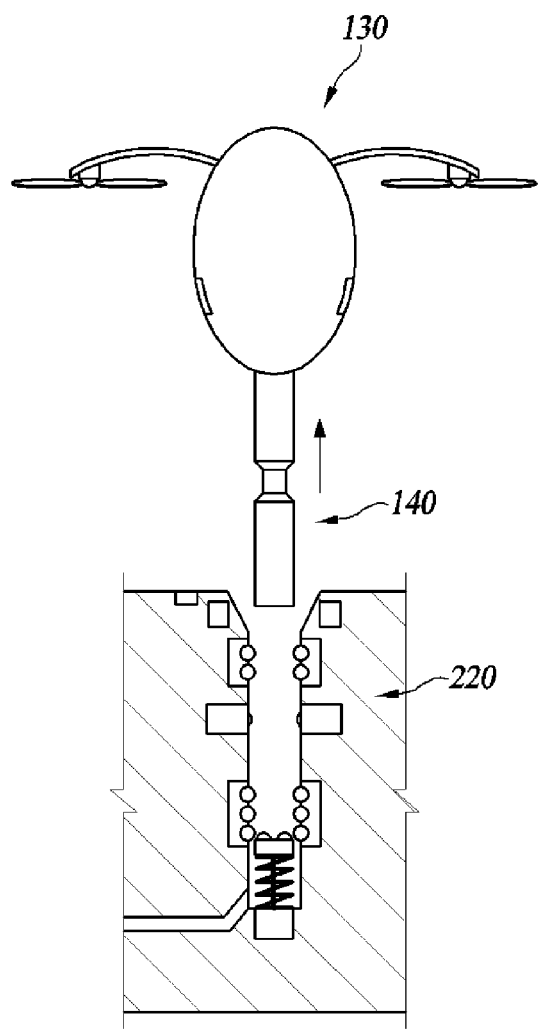

FIG. 4A, FIG. 4B and FIG. 4C are view showing an operating principle of the renewable energy transfer system according to an exemplary embodiment of the present disclosure.

Referring to FIG. 1, FIG. 2, FIG. 3, and FIG. 4A, FIG. 4B and FIG. 4C, the transportation 130 moves to the cabin for storage 220 to transport the storage 140 which stores renewable energy. In the instant case, the communication unit 380 communicates with the transportation 130 to obtain information on the location of the transportation 130 and the distance between the transportation 130 and the cabin for storage 220. The controller 150 may control the locking unit 340 and the cushioning member 360 based on the information obtained by the communication unit 380.

The transportation 130 lands in the cabin for storage 220 to be coupled to the storage 140. At the instant time, the cushioning member 360 may alleviate the impact between the transportation 130 and the cabin for storage 220. When the transportation 130 and the storage 140 are coupled to each other, the controller 150 contracts the air tube included in the locking unit 340. As the transportation 130 moves, the storage 140 coupled to the transportation 130 is removed from the receptacle 320. As a result, the storage 140 which stores the renewable energy is transferred by the transportation 130.

Figure 5:
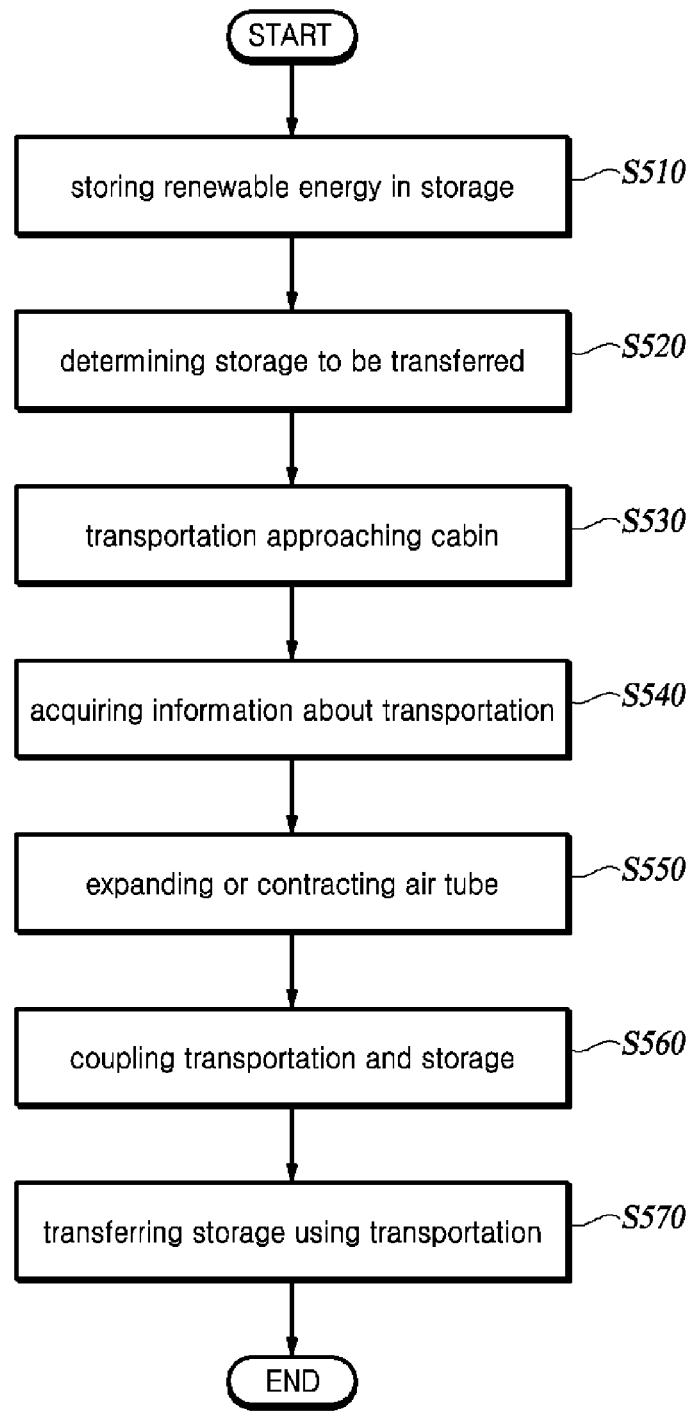
FIG. 5 is a flowchart of a renewable energy transfer method according to an exemplary embodiment of the present disclosure.

FIG. 5 is a flowchart of a renewable energy transfer method according to an exemplary embodiment of the present disclosure.

A charging and storage method for a renewable energy transportation according to an exemplary embodiment of the present disclosure will be described with reference to FIG. 5.

The controller 150 stores renewable energy in the storage 140 using the cabin for storage 220 (S510). Renewable energy is transferred from the renewable energy generator 110 to the first hub 121. The cabin for storage 220 formed in at least a portion of the first hub 121 transfers renewable energy to the storage 140 through the charging unit 330. Renewable energy may be stored in the storage 140 in a form of electrical energy or hydrogen energy. The controller 150 may control the cabin for storage 220 to transfer the renewable energy from the cabin for storage 220 to the storage 140.

The controller is configured to determine the storage 140 to be transferred from the cabin for storage 220 to a destination (S520). The controller 150 may determine the storage 140 to be transported based on the transport distance from the cabin for storage 220 to the destination and weather conditions. When the transport distance is long or the weather conditions such as strong winds or heavy rain are not good, the controller 150 may determine to transport the relatively short second storage 252. When the transport distance is short and the weather conditions are good, the controller 150 may determine to transport the relatively long first storage 251. By determining the storage 140 to be transferred based on the transport distance and weather conditions, the controller 150 can transfer the renewable energy more efficiently.

The transportation 130 approaches the cabin for storage 220 (S530). The controller 150 may control the transportation 130 for transporting the storage 140 to approach the cabin for storage 220.

The communication unit 380 obtains information related to the transportation 130 (S540). The communication unit 380 may communicate with the transportation 130 to obtain information related to the transportation 130. The communication unit 380 may obtain information related to the location of the transportation 130 and the distance between the transportation 130 and the cabin for storage 220. The communication unit 380 transmits the obtained information to the controller 150. The controller 150 may control the charging unit 330, the locking unit 340, the cushioning member 360, and the like, based on the information obtained by the communication unit 380.

The controller 150 expands or contracts the air tube (S550). The controller 150 may expand or contract the air tube based on the information obtained by the communication unit 380. Here, the air tube refers to a cushioning member 360 provided adjacent to a point where the transportation 130 lands. When it is determined that the transportation 130 approaches the cabin for storage 220, the controller 150 expands the air tube. As the air tube is expanded, the impact between the transportation 130 and the cabin for storage 220 may be alleviated.

The transportation 130 and the storage 140 are coupled to each other (S560). When the transportation 130 lands in the cabin for storage 220, the transportation 130 is coupled to the storage to transport the storage 140.

The storage 140 is transferred using the transportation 130 (S570). As the transportation 130 moves, the storage 140 coupled to the transportation 130 moves together with the transportation 130. By the transportation 130 transferring the storage 140 which stores renewable energy, renewable energy may be transferred to a destination.

According to an exemplary embodiment of the present disclosure, the renewable energy transfer system can efficiently transfer renewable energy produced in the coastal waters and distant seas by transporting the storage that stores renewable energy using the transportation.

According to an exemplary embodiment of the present disclosure, the renewable energy transfer system can efficiently charge and store the transportation using the cabin for the transportation.

Although it is described that the processes are sequentially executed in the flowchart of the present disclosure, this is merely illustrative of the technical idea of various exemplary embodiments of the present disclosure. In other words, because an ordinary skilled person in the art to which the exemplary embodiments of the present disclosure pertain may make various modifications and changes by changing the processes described in the flowchart/timing diagram or performing one or more of the processes in parallel without departing from the essential characteristics of the exemplary embodiments of the present disclosure, the flowchart/timing diagram is not limited to a time-series order.

Various implementations of the systems and techniques described herein may be realized by digital electronic circuits, integrated circuits, field programmable gate arrays (FPGAs), application specific integrated circuits (ASICs), computer hardware, firmware, software, and/or combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) include instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, RAM, CD-ROM, magnetic tape, floppy disk, memory card, hard disk, optical disk, and storage device, and may further include a temporary medium such as a data transmission medium. Furthermore, the computer-readable recording medium may be distributed in a network-connected computer system, and computer-readable codes may be stored and executed in a distributed manner.

Various implementations of systems and techniques described herein may be implemented by a programmable computer. Here, the computer includes a programmable processor, a data storage system (including a volatile memory, a nonvolatile memory, or another type of storage system or a combination thereof), and at least one communication interface. For example, a programmable computer may be one of a server, a network device, a set-top box, a built-in device, a computer expansion module, a personal computer, a laptop, a personal data assistant (PDA), a cloud determining system, and a mobile device.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A renewable energy transfer system configured for transferring renewable energy produced in the coastal waters and distant seas, the renewable energy transfer system comprising:
    a storage configured to store the renewable energy;
    a transportation configured to transport the storage; and
    a cabin configured to charge and store the storage,
    wherein the cabin includes a support portion for supporting the storage, an accommodation portion formed in at least a portion of the support portion to selectively accommodate the storage therein, and a charging unit provided in the accommodation portion to transfer the renewable energy to the storage,
    wherein the storage includes a body portion configured to be inserted into the accommodation portion, and a charging terminal formed in at least a portion of the body portion to receive the renewable energy from the charging unit, and
    wherein the transportation comprises at least one of an unmanned aerial vehicle (UAV), an unmanned ship, or a drone.

2. The renewable energy transfer system of claim 1, wherein the cabin further includes a guiding unit provided in the accommodation portion to guide a movement of the storage therein.

3. The renewable energy transfer system of claim 1, wherein the renewable energy is stored in the storage in a form of electrical energy or hydrogen energy.

4. The renewable energy transfer system of claim 1, wherein the charging unit includes one or more plugs, an insulator provided to surround the one or more plugs, and a cable connected to the one or more plugs.

5. The renewable energy transfer system of claim 1, wherein the cabin further includes one or more sensors provided in the accommodation portion.

6. The renewable energy transfer system of claim 5, wherein the one or more sensors detect whether the storage is inserted into the accommodation portion.

7. The renewable energy transfer system of claim 1, wherein the cabin further includes one or more cushioning members provided in the accommodation portion or at the support portion.

8. The renewable energy transfer system of claim 7, wherein the one or more cushioning members include a spring, a damper, or an air tube.

9. The renewable energy transfer system of claim 1, wherein the cabin further includes a locking unit provided in the accommodation portion to selectively fix the storage to the support portion.

10. The renewable energy transfer system of claim 9, further including:
a communication unit which is configured to obtain information related to the transportation by communicating with the transportation; and
a controller which is configured to control the transportation and the cabin according to the information obtained by the communication unit.

11. The renewable energy transfer system of claim 9, wherein the locking unit includes one or more air tubes.

12. The renewable energy transfer system of claim 7, further including:
a communication unit which is configured to obtain information related to the transportation by communicating with the transportation; and
a controller which is configured to control the transportation and the cabin according to the information obtained by the communication unit.

13. The renewable energy transfer system of claim 12, wherein the communication unit is configured to obtain information on at least one of a location of the transportation and a distance between the transportation and the cabin.

14. The renewable energy transfer system of claim 1, wherein the cabin further includes a drain formed through at least a portion of the support portion to fluidically extend from inside of the accommodation portion to an outside thereof.

15. The renewable energy transfer system of claim 1, wherein the charging unit charges the storage wirelessly.

16. The renewable energy transfer system of claim 1,
wherein the storage includes a first storage and a second storage,
wherein the cabin includes a first cabin for accommodating the first storage and a second cabin for accommodating the second storage, and
wherein the first storage has a length longer than a length of the second storage.

17. A renewable energy transfer method for transferring renewable energy produced in the coastal waters and distant seas, the method comprising:
storing the renewable energy in at least one storage using a cabin configured to charge and store the at least one storage;
determining, among the at least one storage, a storage to be transferred from the cabin to a destination based on a distance from the cabin to the destination;
allowing a transportation for transferring the storage to approach the cabin;
coupling the transportation to the storage; and
transferring the storage, using the transportation,
wherein the transportation comprises at least one of an unmanned aerial vehicle (UAV), an unmanned ship, or a drone.

18. The renewable energy transfer method of claim 17, wherein the determining of a storage includes determining the storage to be transferred from the cabin to the destination among the at least one storage based on the distance from the cabin to the destination and weather conditions.

19. The renewable energy transfer method of claim 18, further including:
obtaining information related to at least one of a location of the transportation and a distance between the transportation and the cabin; and
expanding or contracting one or more air tubes provided in the cabin based on the obtained information.

20. The renewable energy transfer method of claim 18, wherein in the storing of renewable energy, the renewable energy is stored in a form of electrical energy or hydrogen energy in the at least one storage.

* * * * *